US011923674B2

(12) United States Patent
Du et al.

(10) Patent No.: US 11,923,674 B2
(45) Date of Patent: Mar. 5, 2024

(54) METHOD AND APPARATUS FOR CONTROLLING SOLID STATE CIRCUIT BREAKER, AND SOLID STATE CIRCUIT BREAKER

(71) Applicant: Siemens Aktiengesellschaft, Munich (DE)

(72) Inventors: Feng Du, Shanghai (CN); Wei Gang Chen, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 330 days.

(21) Appl. No.: 17/598,394

(22) PCT Filed: Mar. 29, 2019

(86) PCT No.: PCT/CN2019/080558
§ 371 (c)(1),
(2) Date: Sep. 27, 2021

(87) PCT Pub. No.: WO2020/198987
PCT Pub. Date: Oct. 8, 2020

(65) Prior Publication Data
US 2022/0158438 A1 May 19, 2022

(51) Int. Cl.
H02H 3/087 (2006.01)
H02H 7/00 (2006.01)

(52) U.S. Cl.
CPC ............ H02H 3/087 (2013.01); H02H 7/008 (2013.01)

(58) Field of Classification Search
CPC ......... H02H 3/087; H02H 7/008; H02H 7/268
(Continued)

(56) References Cited

U.S. PATENT DOCUMENTS 5,170,310 A * 12/1992 Studtmann ............. H02H 3/083
361/65
2014/0361621 A1 12/2014 Lindtjorn
(Continued)

FOREIGN PATENT DOCUMENTS

CA 2910979 A1 1/2015
CN 105529677 A * 4/2016
(Continued)

OTHER PUBLICATIONS

Machine translation of Cheng et al. Chinese Patent Document CN 105529677 A Apr. 2016 (Year: 2016).*
(Continued)

Primary Examiner — Kevin J Comber
(74) Attorney, Agent, or Firm — Harness, Dickey & Pierce, P.L.C.

(57) ABSTRACT

A method for controlling a solid state circuit breaker includes detecting a direction of a current flowing through the solid state circuit breaker, obtaining a breaking current value of the solid state circuit breaker according to the detected direction of the current, obtaining a value of a maximum threshold current to flow through the solid state circuit breaker, obtaining a predicted current value within a next sampling period of a present sampling period of the solid state circuit breaker, comparing the predicted current value with the breaking current value, and upon the predicted current value being greater than the breaking current value, delaying the solid state circuit breaker, and upon the predicted current value being greater than the maximum threshold current value, controlling the solid state circuit breaker to disconnect a circuit in which the solid state circuit breaker resides.

15 Claims, 6 Drawing Sheets

(58) Field of Classification Search
USPC .......................................................... 361/93.1
See application file for complete search history.

(56) References Cited

U.S. PATENT DOCUMENTS

2015/0014277 A1    1/2015  Theisen et al.
2020/0185905 A1*  6/2020  Cairoli .................. H02H 3/093

FOREIGN PATENT DOCUMENTS

| CN | 105529677 A |   | 4/2016 |           |
|----|-------------|---|--------|-----------|
| CN | 106786403 A |   | 5/2017 |           |
| CN | 107846002 A | * | 3/2018 | H02H 7/226 |
| CN | 109494693 A |   | 3/2019 |           |
| JP | S6359715 A  |   | 3/1988 |           |

OTHER PUBLICATIONS

Machine translation of AI et al. Chinese Patent Document CN 107846002 A Mar. 2018 (Year: 2018).*
PCT International Search Report and Written Opinion of International Searching Authority dated Jan. 14, 2020 corresponding to PCT International Application No. PCT/CN2019/080558 filed Mar. 29, 2019.
International Search Report dated Feb. 1, 2023.

\* cited by examiner

METHOD AND APPARATUS FOR CONTROLLING SOLID STATE CIRCUIT BREAKER, AND SOLID STATE CIRCUIT BREAKER

PRIORITY STATEMENT

This application is the national phase under 35 U.S.C. § 371 of PCT International Application No. PCT/CN2019/080558 which has an International filing date of Mar. 29, 2019, which designated the United States of America, the entire contents of which are hereby incorporated herein by reference.

BACKGROUND

Technical Field

Embodiments of the present application relate to circuit control field such as methods and apparatuses for controlling a solid state circuit breaker, and solid state circuit breakers.

Related Art

For a DC power system, it is expected to disconnect a circuit by using a circuit breaker when a failure is detected, to perform device maintenance. The circuit may have a plurality of circuit breakers, and when the failure is detected at a position on the circuit, if the circuit breakers that detect the failure all perform the operation of disconnecting the circuit, excessive devices are disconnected for the failure. This may affect normal running of other devices in the circuit, and increase the complexity of failure removing.

A solid state circuit breaker is applied to the DC power system, and has an advantage of quick response to the failure in the circuit. The solid state circuit breaker has a threshold of a breaking current, and a current flowing through the solid state circuit breaker is limited. If a fault current exceeds the threshold of the breaking current, the solid state circuit breaker performs the operation of the breaking circuit. The solid state circuit breaker performs the operation within a safe current range, and if the current flowing through the solid state circuit breaker exceeds the safe current range, the solid state circuit breaker may be damaged.

SUMMARY

If the failure occurs at a position in the circuit, in consideration of the device protection and the coordination between a circuit breaker and a self-protection function of a converter, it is difficult to correctly selectively disconnect a device close to the failure position. For example, because a device such as a motor used as a load may generate a current flowing from a load end of a power grid to a power supply end of the power grid, a solid state circuit breaker at the load end of the power grid may incorrectly disconnect the circuit. As a result, it is difficult to selectively disconnect a to-be-disconnected device, or even the solid state circuit breaker may be damaged.

Embodiments of this application provide a method and an apparatus for controlling a solid state circuit breaker, and a solid state circuit breaker.

According to an example embodiment of this application, a method for controlling a solid state circuit breaker is provided, including: detecting a direction of a current flowing through the solid state circuit breaker, where the solid state circuit breaker is at a power supply end of a power grid bus in a directed current (DC) power grid; obtaining a breaking current value of the solid state circuit breaker according to the detected direction of the current; obtaining a value of a maximum threshold current allowed to flow through the solid state circuit breaker, where the breaking current value is less than the maximum threshold current value; obtaining a predicted current value within a next sampling period of a present sampling period of the solid state circuit breaker; comparing the predicted current value with the breaking current value; and upon the predicted current value is greater than the breaking current value, delaying the solid state circuit breaker, and upon the predicted current value being greater than the maximum threshold current value, controlling the solid state circuit breaker to disconnect a circuit in which the solid state circuit breaker resides.

In this example, a waiting time is set for the solid state circuit breaker of the power supply end, so that the solid state circuit breaker does not immediately perform the operation of disconnecting the circuit when detecting a fault current, and circuit breakers at other positions on the circuit can detect a failure, thereby making a circuit breaker close to the failure disconnect the selective circuit protection of the circuit.

According to an example embodiment of this application, the method further includes: obtaining a first current value, the first current value being detected within a sampling period of the solid state circuit breaker; and determining the predicted current value within the next sampling period of the present sampling period of the solid state circuit breaker according to the first current value.

In this example, a current value of the coming current is predicted according to the current value that has been detected by the solid state circuit breaker, so that the solid state circuit breaker can determine in advance whether to perform the operation of disconnecting the circuit.

According to an example embodiment of this application, the detected direction of the current includes a forward direction or a backward direction, where the forward direction represents a direction from a power supply end of the solid state circuit breaker to a load end of the solid state circuit breaker, and the backward direction represents a direction from the load end of the solid state circuit breaker to the power supply end of the solid state circuit breaker, and the obtained breaking current value includes a forward breaking current value corresponding to a forward current or a backward breaking current value corresponding to a backward current, where the forward breaking current value represents a current value of a breaking current of the solid state circuit breaker when the forward current flows through the solid state circuit breaker, and the backward breaking current value represents a current value of a breaking current of the solid state circuit breaker when the backward current flows through the solid state circuit breaker.

In this example, the direction of the fault current is detected for the solid state circuit breaker located at the power supply end of the power grid bus, thereby using different methods for controlling a solid state circuit breaker for different failure position situations, so that the selective circuit protection of the solid state circuit breaker normally runs.

According to an example embodiment of this application, upon the detected direction of the current being the forward direction, the obtaining a breaking current value of the solid state circuit breaker obtains the forward breaking current value of the solid state circuit breaker, and the comparing the predicted current value with the breaking current value includes comparing the predicted current value with the forward breaking current value.

In this example, the current value of the current flowing from the power supply end in the circuit to the load end is compared with the forward breaking current value corresponding to the direction, to determine whether to operate the solid state circuit breaker to protect the circuit for the current in the direction, and perform selective protection of the circuit when the current flows in a forward direction.

According to an example embodiment of this application, upon the detected direction of the current being the backward direction, the obtaining a breaking current value of the solid state circuit breaker obtains the backward breaking current value of the solid state circuit breaker, and the comparing the predicted current value with the breaking current value includes comparing the predicted current value with the backward breaking current value.

In this example, the current value of the current flowing from the load end in the circuit to the power supply end is compared with the backward breaking current value corresponding to the direction, to determine whether to operate the solid state circuit breaker to protect the circuit for the current in the direction, and perform selective protection of the circuit when the current flows in a backward direction.

According to other example embodiments of this application, a method for controlling a solid state circuit breaker is further provided, including: detecting a direction of a current flowing through the solid state circuit breaker, where the solid state circuit breaker is at a load end of a power grid bus in a DC power grid; obtaining a value of a maximum threshold current to flow through the solid state circuit breaker; obtaining a predicted current value within a next sampling period of a present sampling period of the solid state circuit breaker; comparing the predicted current value with the maximum threshold current value upon the detected direction of the current being a direction from a load end of the solid state circuit breaker to a power supply end of the solid state circuit breaker; and upon the predicted current value being greater than the maximum threshold current value, controlling the solid state circuit breaker to disconnect the circuit in which the solid state circuit breaker resides.

In this example, when a backward fault current flows through the solid state circuit breaker located at the load end of the power grid bus in the DC power grid, the solid state circuit breaker waits but does not immediately disconnect the circuit, and when the predicted current value is greater than the maximum threshold current value, disconnects the circuit in which the solid state circuit breaker resides, so that the solid state circuit breaker close to the failure position can preferentially disconnect the circuit.

According to an example embodiment of this application, the method further includes: obtaining a breaking current value of the solid state circuit breaker; comparing the predicted current value with the breaking current value upon the detected direction of the current being a direction from the power supply end of the solid state circuit breaker to the load end of the solid state circuit breaker; and upon the predicted current value being greater than the breaking current value, the solid state circuit breaker to disconnect the circuit in which the solid state circuit breaker resides.

In this example, when a forward fault current flows through the solid state circuit breaker located at the load end of the power grid bus in the DC power grid, the solid state circuit breaker is used as a solid state circuit breaker close to the failure position and can preferentially disconnect the circuit.

According to an example embodiment of this application, the method further includes: obtaining a first current value, the first current value detected within a sampling period of the solid state circuit breaker; and determining the predicted current value of the coming current within the next sampling period of the present sampling period of the solid state circuit breaker according to the first current value.

In this example, a current value of the coming current is predicted according to the current value that has been detected by the solid state circuit breaker, so that the solid state circuit breaker can determine in advance whether to perform the operation of disconnecting the circuit.

According to other example embodiments of this application, an apparatus for controlling a solid state circuit breaker is further provided, including: a current direction detection unit configured to detect a direction of a current flowing through the solid state circuit breaker, where the solid state circuit breaker is at a power supply end of a power grid bus in a DC power grid; a breaking current value obtaining unit configured to obtain a breaking current value of the solid state circuit breaker according to the detected direction of the current; a maximum threshold obtaining unit configured to obtain a value of a maximum threshold current to flow through the solid state circuit breaker, where the breaking current value is less than the maximum threshold current value; a predicted current value obtaining unit configured to obtain a predicted current value within a next sampling period of a present sampling period of the solid state circuit breaker; a comparison unit configured to compare the predicted current value with the breaking current value; and a breaking unit configured to delay the solid state circuit breaker upon the predicted current value being greater than the breaking current value, and control the solid state circuit breaker to disconnect a circuit in which the solid state circuit breaker resides when the predicted current value is greater than the maximum threshold current value.

In this example, the apparatus for controlling a solid state circuit breaker is disposed, and a waiting time is set for the solid state circuit breaker of the power supply end, so that the solid state circuit breaker does not immediately perform the operation of disconnecting the circuit when detecting a fault current, and circuit breakers at other positions on the circuit can detect a failure, thereby making a circuit breaker close to the failure disconnect the selective circuit protection of the circuit.

The apparatus for controlling a solid state circuit breaker includes: a current direction detection unit configured to detect a direction of a current flowing through the solid state circuit breaker, where the solid state circuit breaker is at a load end of a power grid bus in a DC power grid; a maximum threshold obtaining unit configured to obtain a value of a maximum threshold current to flow through the solid state circuit breaker; a predicted current value obtaining unit configured to obtain a predicted current value within a next sampling period of a present sampling period of the solid state circuit breaker; a comparison unit configured to compare the predicted current value with the maximum threshold current value upon the detected direction of the current being a direction from a load end of the solid state circuit breaker to a power supply end; and a breaking unit configured to control the solid state circuit breaker to disconnect a circuit in which the solid state circuit breaker resides upon the predicted current value being greater than the maximum threshold current value.

In this example, the apparatus for controlling a solid state circuit breaker is disposed, and a waiting time is set for the solid state circuit breaker of the load end, so that the solid state circuit breaker does not immediately perform the operation of disconnecting the circuit when detecting a fault current, and circuit breakers at other positions on the circuit can detect a failure, thereby making a circuit breaker close to the failure disconnect the selective circuit protection of the circuit.

According to other example embodiments of this application, a solid state circuit breaker is further provided, where the solid state circuit breaker is at a power supply end of a power grid bus in a DC power grid, and includes an apparatus for controlling the solid state circuit breaker, the apparatus including: a current direction detection unit configured to detect a direction of a current flowing through the solid state circuit breaker; a breaking current value obtaining unit configured to obtain a breaking current value of the solid state circuit breaker according to the detected direction of the current; a maximum threshold obtaining unit configured to obtain a value of a maximum threshold current to flow through the solid state circuit breaker, where the breaking current value is less than the maximum threshold current value; a predicted current value obtaining unit configured to obtain a predicted current value within a next sampling period of a present sampling period of the solid state circuit breaker; a comparison unit configured to compare the predicted current value with the breaking current value; and a breaking unit configured to delay the solid state circuit breaker upon the predicted current value being greater than the breaking current value, and control the solid state circuit breaker to disconnect a circuit in which the solid state circuit breaker resides when the predicted current value is greater than the maximum threshold current value.

In this example, the apparatus for controlling a solid state circuit breaker is disposed in the solid state circuit breaker of the power supply end, and a waiting time is set for the solid state circuit breaker, so that the solid state circuit breaker does not immediately perform the operation of disconnecting the circuit when detecting a fault current, so that circuit breakers at other positions on the circuit can detect a failure, thereby making a circuit breaker close to the failure disconnect the selective circuit protection of the circuit.

According to an example embodiment of this application, the solid state circuit breaker further includes: a current limiting unit configured to limit an increasing rate of the current flowing through the solid state circuit breaker.

In this example, it is avoided to rapidly increase the current flowing through the solid state circuit breaker to damage the solid state circuit breaker.

According to other example embodiments of this application, a solid state circuit breaker is further provided, where the solid state circuit breaker is at a load end of a power grid bus in a DC power grid, the solid state circuit breaker includes an apparatus for controlling the solid state circuit breaker, and the apparatus including: a current direction detection unit configured to detect a direction of a current flowing through a solid state circuit breaker; a maximum threshold obtaining unit configured to obtain a value of a maximum threshold current to flow through the solid state circuit breaker; a predicted current value obtaining unit configured to obtain a predicted current value within a next sampling period of a present sampling period of the solid state circuit breaker; a comparison unit configured to compare the predicted current value with the maximum threshold current value upon the detected direction of the current being a direction from a load end of the solid state circuit breaker to a power supply end; and a breaking unit configured to control the solid state circuit breaker to disconnect a circuit in which the solid state circuit breaker resides upon the predicted current value being greater than the maximum threshold current value.

In this example, the apparatus for controlling a solid state circuit breaker is disposed in the solid state circuit breaker of the load end, and a waiting time is set for the solid state circuit breaker, so that the solid state circuit breaker does not immediately perform the operation of disconnecting the circuit when detecting a fault current, so that circuit breakers at other positions on the circuit can detect a failure, thereby making a circuit breaker close to the failure disconnect the selective circuit protection of the circuit.

In example embodiments of this application, a technical solution of setting a waiting time for a solid state circuit breaker is provided, to detect a direction of a current flowing through the solid state circuit breaker. For a current flowing from a power supply end of a power grid to a load end, if the solid state circuit breaker of the power supply end detects that a predicted value of a coming current exceeds its preset forward breaking current, the solid state circuit breaker does not immediately disconnect the circuit, but waits for a period of time. When the predicted value of the current is estimated to determine that the coming current exceeds a maximum threshold current value of the solid state circuit breaker or may damage the solid state circuit breaker, the solid state circuit breaker performs the operation of disconnecting the circuit; or for the current flowing from the load end of the power grid to the power supply end, if the solid state circuit breaker of the load end detects that the predicted value of the coming current exceeds the maximum threshold current value of the solid state circuit breaker or may damage the solid state circuit breaker, the solid state circuit breaker performs the operation of disconnecting the circuit, to at least resolve the technical problem in which it is difficult to safely selectively correctly disconnect a device close to a failure position in a DC power grid, and implement the technical effect of protecting the solid state circuit breaker and disconnecting a to-be-disconnected circuit when a fault occurs.

BRIEF DESCRIPTION OF THE DRAWINGS

The accompanying drawings described herein are used for provide further understanding of this application, and form a part of this application. Example embodiments of this application and descriptions of the example embodiments are used for explaining this application, and do not form an improper limitation to this application. In the accompanying drawings.

DESCRIPTIONS OF NUMBERS OF THE ACCOMPANYING DRAWINGS

100. AC power supply;
110, 120. AC/DC converter;
130. Battery power supply;
140. PV power supply;
150. DC bus;
PD-S1.1, PD-S1.2, PD-S2.1, PD-S2.2, PD-S3.1, PD-S3.2, PD-S4.1, PD-S4.2, PD-L1, PD-L2, PD-L3, PD-L4. Solid state circuit breakers;
111, 113, 115, 117. Loads;
F1~F3. Positions at which a failure may occur;
S201~S211, S301~S309. Steps;
4. Apparatus for controlling a solid state circuit breaker;
401. Current direction detection unit;
403. Breaking current value obtaining unit;
405. Maximum threshold obtaining unit;
407. Predicted current value obtaining unit;
409. Comparison unit;
411. Breaking unit;
5. Apparatus for controlling a solid state circuit breaker;
501. Current direction detection unit;
503. Maximum threshold obtaining unit;
505. Predicted current value obtaining unit;
507. Comparison unit;
509. Breaking unit;
6, 7. Solid state circuit breakers; and
61, 71. Current limiting components.

DETAILED DESCRIPTION

To make a person skilled in the art understand the solutions in this application better, the following clearly and completely describes the technical solutions in the embodiments of this application with reference to the accompanying drawings in the embodiments of this application. The described embodiments are merely examples. All other embodiments obtained by a person skilled in the art based on the embodiments of this application without creative efforts shall fall within the protection scope of this application.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. In addition, the terms "include", "comprise", and any variants thereof are intended to cover a non-exclusive inclusion. For example, a process, method, system, product, or device that includes a series of steps or modules or elements is not limited to the steps or modules or units that are clearly listed, but may include other steps or modules or units that are not clearly listed or that are inherent to the process, method, product, or device.

Figure 1:
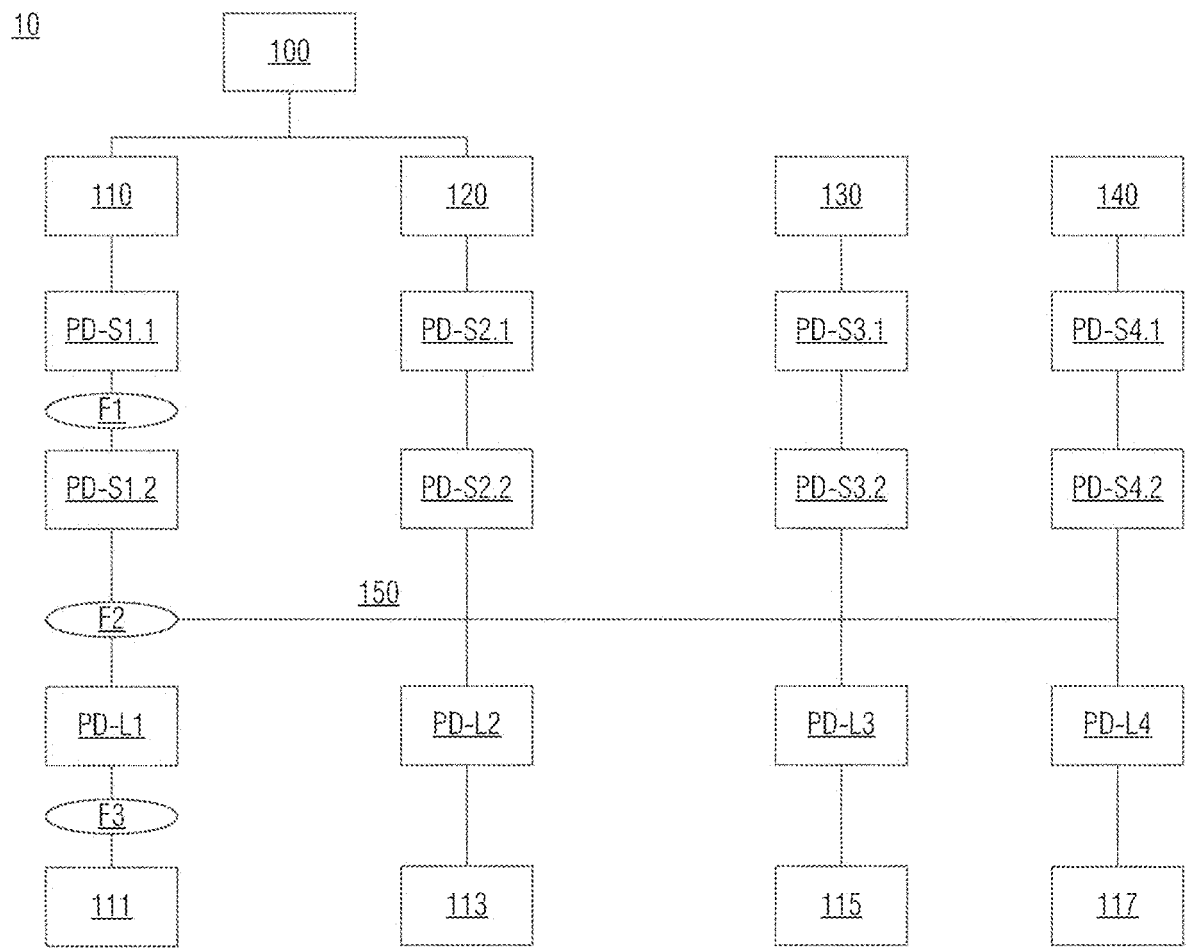
FIG. 1 is a schematic diagram of a circuit system in which a solid state circuit breaker is used to perform a circuit protection solution according to an example embodiment.

FIG. 1 is a schematic diagram of a circuit system in which a solid state circuit breaker is used to perform a circuit protection solution according to an example embodiment. As shown in FIG. 1, a circuit 10 includes an AC power supply 100, an AC/DC converter 110, an AC/DC converter 120, a battery power supply 130, a PV power supply 140, a load 111, a load 113, a load 115, and a load 117. The AC/DC converter 110, the AC/DC converter 120, the battery power supply 130, and the PV power supply 140 are connected to the load 111, the load 113, the load 115, and the load 117 by using a DC power grid bus 150. A solid state circuit breaker PD-S1.1 and a solid state circuit breaker PD-S1.2 are connected in series at a power supply end of a power grid between the AC/DC converter 110 and the DC power grid bus 150, a solid state circuit breaker PD-S2.1 and a solid state circuit breaker PD-S2.2 are connected in series at a power supply end of a power grid between the AC/DC converter 120 and the DC power grid bus 150, a solid state circuit breaker PD-S3.1 and a solid state circuit breaker PD-S3.2 are connected in series at a power supply end of a power grid between the battery power supply 130 and the DC power grid bus 150, and a solid state circuit breaker PD-S4.1 and a solid state circuit breaker PD-S4.2 are connected in series at a power supply end of a power grid between the PV power supply 140 and the DC power grid bus 150. A solid state circuit breaker PD-L1, a solid state circuit breaker PD-L2, a solid state circuit breaker PD-L3, and a solid state circuit breaker PD-L4 are connected in series at a load end of a power grid between the load 111 and the DC power grid bus 150, between the load 113 and the DC power grid bus 150, between the load 115 and the DC power grid bus 150, and between the load 117 and the DC power grid bus 150 respectively. F1, F2, and F3 respectively represent a position at which a failure may occur.

For an expected selective protection of the circuit, it is hoped that only a circuit close to the failure position is disconnected, so that other devices may not be affected by the failure and continue to run. If a failure occurs at F1, it is hoped that only the solid state circuit breakers PD-S1.1 and PD-S1.2 close to the failure position disconnect the circuit. In other words, if a failure occurs at F1, it is hoped that the solid state circuit breakers PD-S1.1 and PD-S1.2 perform the operation of disconnecting the circuit before other solid state circuit breakers disconnect the circuit, and do not damage the components in the circuit. If a failure occurs at F2, it is hoped that all solid state circuit breakers of the power supply end, that is, the solid state circuit breaker PD-S1.1, the solid state circuit breaker PD-S1.2, the solid state circuit breaker PD-S2.1, the solid state circuit breaker PD-S2.2, the solid state circuit breaker PD-S3.1, the solid state circuit breaker PD-S3.2, the solid state circuit breaker PD-S4.1, and the solid state circuit breaker PD-S4.2 perform the operation of disconnecting the circuit, but do not damage the power supply. If a failure occurs at F3, it is hoped that only the solid state circuit breaker PD-L1 of the load end performs the operation of disconnecting the circuit, but does not affect other solid state circuit breakers or power supplies. By using the selective protection, the solid state circuit breaker close to the failure position performs the operation of disconnecting the circuit, to correctly disconnect the device affected by the failure from the circuit.

Selective circuit protection may be provided by a method for controlling a solid state circuit breaker according to this embodiment of this application. In an embodiment according to this application, a solid state circuit breaker is used in the DC power grid system as shown in FIG. 1 to disconnect the device from the circuit having failures. The solid state circuit breaker is disposed at the power supply end and the load end of the DC power grid bus, and when facing a DC failure, the solid state circuit breaker has a response speed faster than a converter or an inverter. For example, a self-protection response period of the converter or the inverter is usually greater than 40 µs, while a response period of the solid state circuit breaker is usually about 10 µs. If the solid state circuit breaker can be used to disconnect the device from the fault circuit faster, the device is protected, and the solid state circuit breaker makes a response before the converter or the inverter performs self-protection to correctly perform coordination.

In the embodiments of this application, in addition to a current threshold of a conventional breaking circuit that the solid state circuit breaker itself has, a safe current threshold is further set for the solid state circuit breakers disposed at the power supply end and the load end, and if the current value of the current flowing through the solid state circuit breaker exceeds the safe current threshold, it indicates that an excessive current may damage the solid state circuit breaker. The safe current threshold (e.g., a maximum threshold current value) of the solid state circuit breaker should be greater than a current threshold (e.g., a breaking current value) of a breaking circuit of the solid state circuit breaker; otherwise, if the current flowing through the solid state circuit breaker is greater than the current threshold of the breaking circuit of the solid state circuit breaker and the solid state circuit breaker does not perform the operation of disconnecting the circuit, the solid state circuit breaker may be damaged because the current in the circuit exceeds the safe current threshold. The safe current threshold of the solid state circuit breaker is greater than the current threshold of the breaking circuit, so that even though when the solid state circuit breaker does not immediately disconnect the circuit when the current is greater than the current threshold of the breaking circuit, the solid state circuit breaker may also not be damaged. Such a solid state circuit breaker can perform a waiting operation when detecting that the current is greater than the current threshold of the breaking circuit, to reserve a response opportunity for other solid state circuit breakers that may be closer to the failure position. That is, when detecting a fault current, a solid state circuit breaker waits for a period of time, until another solid state circuit breaker close to the failure position performs the disconnecting operation, thereby implementing selective protection of the circuit. If it is detected in the waiting process of the solid state circuit breaker that the coming current will exceed its safe current threshold, the solid state circuit breaker performs the operation of disconnecting the circuit to protect the solid state circuit breaker from being damaged.

Figure 2:
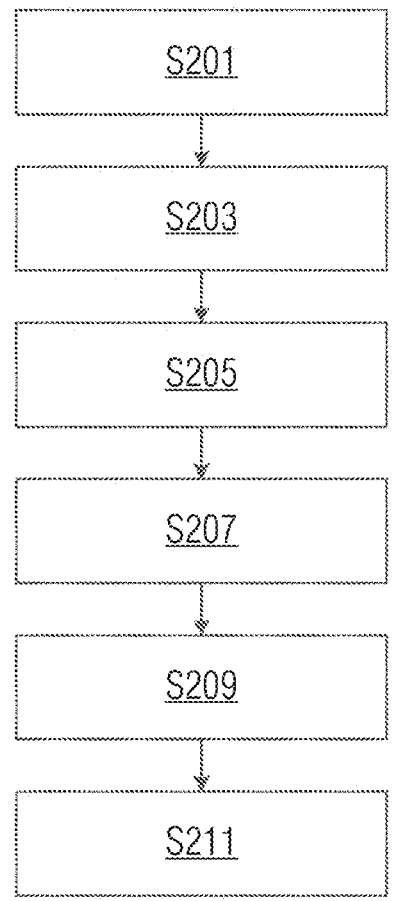
FIG. 2 is a flowchart of a method for controlling a solid state circuit breaker according to an example embodiment of this application.

FIG. 2 is a flowchart of a method for controlling a solid state circuit breaker according to an embodiment of this application. As shown in FIG. 2, the method for controlling a solid state circuit breaker according to an embodiment of this application includes: Step S201. Detect a direction of a current flowing through a solid state circuit breaker. In this embodiment, the solid state circuit breaker is located at a power supply end of a power grid bus in a DC power grid, such as PD-S1.1 or PD-S1.2 in FIG. 1. For example, for the solid state circuit breaker PD-S1.2 disposed in the power supply end, if a failure position is at F1, a direction of a fault current flowing through the solid state circuit breaker PD-S1.2 is from the load end to the power supply end. If the failure position is at F2 or F3, the direction of the fault current flowing through the solid state circuit breaker PD-S1.2 is from the power supply end to the load end. Difference of the positions at which the fault occurs causes different directions of the fault current flowing through the solid state circuit breaker. In step S203, a breaking current value of the solid state circuit breaker is obtained according to the detected direction of the current. If it is detected that the fault current is greater than the breaking current value in the corresponding direction, the conventional solid state circuit breaker performs the operation of disconnecting the circuit.

In step S205, a value of a maximum threshold current allowed to flow through the solid state circuit breaker is obtained, where the breaking current value is less than the maximum threshold current value. The maximum threshold current value is a maximum safe current value of the solid state circuit breaker, and if the current flowing through the solid state circuit breaker exceeds the maximum threshold current value, the solid state circuit breaker may be damaged. In step S207, a predicted current value of a coming current within a next sampling period of a present sampling period of the solid state circuit breaker is obtained. The solid state circuit breaker according to this application makes a response before the current exceeding the maximum threshold current value reaches the solid state circuit breaker, and the calculation of the current value within the coming next sampling period is implemented through prediction, so that it may prevent the increasing speed of the current value within a sampling period from exceeding the maximum threshold current value and may avoid damaging the solid state circuit breaker. In step S209, the predicted current value is compared with the breaking current value. In step S211, if the predicted current value is greater than the breaking current value, the solid state circuit breaker is made to wait, and when the predicted current value is greater than the maximum threshold current value, the solid state circuit breaker is made to disconnect the circuit in which the solid state circuit breaker resides. That the predicted current value is greater than the breaking current value means that there is a fault current flowing through the solid state circuit breaker, and if the solid state circuit breaker immediately disconnects the circuit, the device protected by the solid state circuit breaker may be disconnected from the circuit. If all the solid state circuit breakers that detect the fault current perform the operation of disconnecting the circuit, in addition to the device closest to the failure position in the circuit, many normally running devices may also be disconnected from the circuit by the solid state circuit breaker. In this embodiment of this application, the solid state circuit breaker does not immediately perform the operation of disconnecting the circuit when detecting the fault current, but performs a waiting operation until a predicted current value within a next sampling period exceeds the maximum threshold current value or performs the operation of disconnecting the circuit only when the coming current may damage the solid state circuit breaker. During the waiting period of the solid state circuit breaker of the power supply end, if the solid state circuit breakers at other failure positions disconnect the circuit (for example, the solid state circuit breaker close to the failure position disconnects the circuit), the fault current disappears, and the solid state circuit breaker does not need to disconnect the circuit, so that the device and the circuit protected by the solid state circuit breaker normally run, but the device or the circuit affected by the fault has been disconnected from the circuit by the solid state circuit breakers at other failure positions that perform the operation of disconnecting the circuit, thereby implementing the selective protection of the circuit.

According to an example embodiment of this application, the method further includes: obtaining a current value detected within a sampling period of the solid state circuit breaker; and determining a predicted current value of a coming current within a next sampling period of the present sampling period of the solid state circuit breaker according to the detected current value. In the method for controlling a solid state circuit breaker according to this embodiment of this application, to prevent/reduce the likelihood of the current flowing through the solid state circuit breaker not exceeding its safe current threshold, a current value detected within each sampling period for the solid state circuit breaker to detect the current is obtained, a predicted current value of a coming current within a next sampling period of the present sampling period is estimated according to the detected current value and duration of the next sampling period, or a current peak of the coming current is predicted according to parameters in the circuit system. Within the time of the present sampling period, if it is obtained through calculation that the predicted current value or the current peak of the coming current exceeds the breaking current value of the solid state circuit breaker, it indicates that a fault current occurs, and a failure may occur in the circuit. Within the time of the present sampling period, if it is obtained through calculation that the predicted current value or the current peak of the coming current exceeds the safe current threshold of the solid state circuit breaker, the solid state circuit breaker performs the operation of disconnecting the circuit, to disconnect the circuit before a current that may cause damage to the solid state circuit breaker reaches the solid state circuit breaker, and ensure the device safety. In the method for controlling a solid state circuit breaker according to this embodiment of this application, the predicted current value of the coming current is determined according to the current value detected by the solid state circuit breaker, so that the solid state circuit breaker can determine in advance whether a fault current occurs and whether to perform the operation of disconnecting the circuit. The predicted current value of the coming current may also be determined based on different sampling periods, for example, the current value of the current is predicted within a preset period of time after the present sampling period.

According to an example embodiment of this application, the detected direction of the current includes a forward direction and a backward direction, where the forward direction represents a direction from a power supply end of the solid state circuit breaker to a load end, and the backward direction represents a direction from the load end of the solid state circuit breaker to the power supply end, and the breaking current value includes a forward breaking current value corresponding to a forward current and a backward breaking current value corresponding to a backward current, where the forward breaking current value represents a current value of a breaking current of the solid state circuit breaker when the forward current flows through the solid state circuit breaker, and the backward breaking current value represents a current value of a breaking current of the solid state circuit breaker when the backward current flows through the solid state circuit breaker.

According to an example embodiment of this application, if the detected direction of the current is the forward direction, the obtaining a breaking current value of the solid state circuit breaker includes obtaining the forward breaking current value of the solid state circuit breaker, and the comparing the predicted current value with the breaking current value includes comparing the predicted current value with the forward breaking current value. The current value of the current flowing from the power supply end in the circuit to the load end is compared with the forward breaking current value corresponding to the direction, to determine whether to operate the solid state circuit breaker to protect the circuit for the current in the direction, and perform selective protection of the circuit when the current flows in a forward direction.

According to an example embodiment of this application, if the detected direction of the current is the backward direction, the obtaining a breaking current value of the solid state circuit breaker includes obtaining the backward breaking current value of the solid state circuit breaker, and the comparing the predicted current value with the breaking current value includes comparing the predicted current value with the backward breaking current value. The current value of the current flowing from the load end in the circuit to the power supply end is compared with the backward breaking current value corresponding to the direction, to determine whether to operate the solid state circuit breaker to protect the circuit for the current in the direction, and perform selective protection of the circuit when the current flows in a backward direction.

As shown in FIG. 1, for a solid state circuit breaker disposed at a power supply end of the DC power grid bus 150, for example, the solid state circuit breaker PD-S1.2, if the failure position is at F2 or F3, the fault current is a forward current, that is, the current flows from the power supply end to the load end. To determine whether the fault current is detected, a fault current value (for example, the predicted value of the coming current as described above) is compared with a forward breaking current of the solid state circuit breaker PD-S1.2, and if the fault current value is greater than the forward breaking current, it indicates that the failure occurs in the circuit at the load end of the solid state circuit breaker PD-S1.2. If the failure position is at F1, for the solid state circuit breaker PD-S1.2, the fault current (for example, a backward current delivered to the circuit by a motor used as a load) flows from the load end of the solid state circuit breaker PD-S1.2 to the power supply end of the solid state circuit breaker PD-S1.2 through the solid state circuit breaker PD-S1.2. To determine whether the fault current is detected, the fault current value is compared with the backward breaking current of the solid state circuit breaker PD-S1.2, and if the fault current value is greater than the backward breaking current, in indicates that the failure occurs in the circuit of the power supply end of the solid state circuit breaker PD-S1.2. That is, for the solid state circuit breaker disposed at the power supply end of the DC power grid bus 150, in addition to the forward breaking current value for the forward current, a backward breaking current value is further set, so that the operation of the breaking circuit can be triggered when the failure position is at the power supply end or the load end. The detected direction of the fault current represents that the failure position may occur at the power supply end or the load end of the solid state circuit breaker. The direction of the fault current is detected for the solid state circuit breaker located at the power supply end of the power grid bus, thereby using different methods for controlling a solid state circuit breaker for different failure position situations, so that the selective circuit protection of the solid state circuit breaker normally runs.

As shown in FIG. 1, for example, if a failure occurs at the position F3, the fault current flowing through the solid state circuit breaker PD-S1.2 is a forward current, and when detecting the fault current (that is, the predicted value of the current is greater than the forward breaking current), the solid state circuit breaker PD-S1.2 does not immediately perform the operation of the breaking circuit, but waits, and the solid state circuit breaker close to F3 (for example, the solid state circuit breaker PD-L1 of the load end) performs the operation of disconnecting the circuit, so that the failure position is isolated from the power grid, the fault current disappears, the solid state circuit breaker PD-S1.2 does not need to disconnect the circuit, and a power supply branch in which the solid state circuit breaker PD-S1.2 resides is not affected by the failure, to implement the selective protection of the circuit. Alternatively, for example, within the waiting time of the solid state circuit breaker PD-S1.2, if the predicted value of the current exceeds the maximum threshold current value of the solid state circuit breaker PD-S1.2, the solid state circuit breaker PD-S1.2 performs the operation of disconnecting the circuit to protect the device safety.

Figure 3:
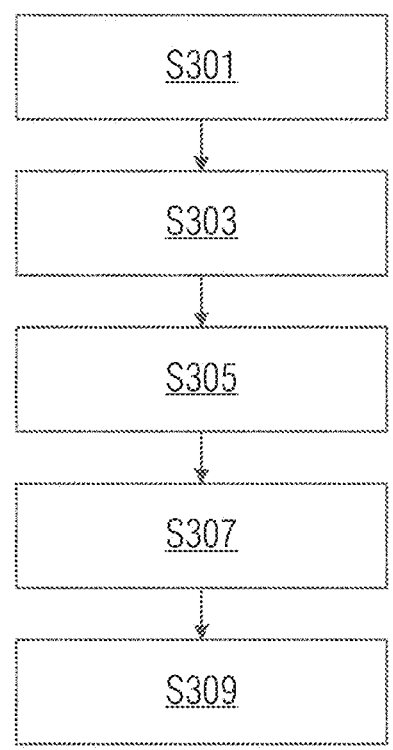
FIG. 3 is a flowchart of a method for controlling a solid state circuit breaker according to another example embodiment of this application.

According to another embodiment of this application, a method for controlling a solid state circuit breaker is further provided. FIG. 3 is a flowchart of a method for controlling a solid state circuit breaker according to another embodiment of this application. As shown in FIG. 3, the method for controlling a solid state circuit breaker according to another embodiment of this application includes: Step S301. Detect a direction of a current flowing through a solid state circuit breaker. In the method for controlling a solid state circuit breaker according to another embodiment of this application, the solid state circuit breaker is located at a load end of a power grid bus in the DC power grid. Step S303. Obtain a value of a maximum threshold current allowed to flow through the solid state circuit breaker. Step S305. Obtain a predicted current value of a coming current within a next sampling period of a present sampling period of the solid state circuit breaker. Step S307. Compare the predicted current value with the maximum threshold current value if the detected direction of the current is a direction from a load end of the solid state circuit breaker to the power supply end. Step S309. Make, if the predicted current value is greater than the maximum threshold current value, the solid state circuit breaker disconnect the circuit in which the solid state circuit breaker resides.

As shown in FIG. 1, for example, in the solid state circuit breaker PD-L1, the solid state circuit breaker located at the load end of the power grid bus in the DC power grid is connected to the load 111. If it is detected that the direction of the current flowing through the solid state circuit breaker PD-L1 is from the load 111 to the power supply end of the solid state circuit breaker PD-L1, that is, the fault current is in a backward direction, it indicates that the failure position is at the power supply end of the solid state circuit breaker PD-L1. Therefore, the F3 position and the load branch in which the load 111 resides do not need to be disconnected from the power grid. In principle, other solid state circuit breakers close to the failure position than the solid state circuit breaker PD-L1 perform the operation of disconnecting the circuit, and the solid state circuit breaker PD-L1 disconnects the circuit only when the fault current may cause damage to the solid state circuit breaker PD-L1.

As shown in FIG. 1, for example, if a failure occurs at the position F1, the solid state circuit breaker PD-L1 detects a backward current, and the solid state circuit breaker PD-L1 only disconnects the branch from the power grid only when the predicted value of the coming current exceeds a safe threshold current value of the solid state circuit breaker PD-L1. Previously, the solid state circuit breaker PD-S1.1 and the solid state circuit breaker PD-S1.2 detect the fault current and perform the operation of disconnecting the circuit, thereby isolating the failure position F1 from the power grid. In this way, when the backward fault current flows through the solid state circuit breaker located at the load end of the power grid bus in the DC power grid, the solid state circuit breaker waits instead of immediately disconnecting the circuit, and disconnects the circuit in which the solid state circuit breaker resides only when the predicted current value is greater than the maximum threshold current value, so that the solid state circuit breaker close to the failure position can preferentially disconnect the circuit, but the branch in which the solid state circuit breaker of the load end resides is not affected.

According to an example embodiment of this application, the method further includes: obtaining a breaking current value of the solid state circuit breaker. If the detected direction of the current is the direction from the power supply end of the solid state circuit breaker to the load end, the predicted current value is compared with the breaking current value; and if the predicted current value is greater than the breaking current value, the solid state circuit breaker disconnects the circuit in which the solid state circuit breaker resides.

As shown in FIG. 1, for example, if it is detected that the direction of the current flowing through the solid state circuit breaker PD-L1 of the load end is the direction from the power supply end of the solid state circuit breaker PD-L1 to the load end, that is, the forward direction, and the predicted current value is greater than the breaking current value of the solid state circuit breaker PD-L1, it indicates that the failure occurs at the load end of the solid state circuit breaker PD-L1, for example, the failure occurs at F3. The load branch at which the failure occurs should be disconnected from the power grid. Therefore, the solid state circuit breaker PD-L1 performs the operation of disconnecting the circuit, so that other devices in the power grid are not affected. In this way, when the forward fault current flows through the solid state circuit breaker located at the load end of the power grid bus in the DC power grid, the solid state circuit breaker is used as the solid state circuit breaker close to the failure position and can preferentially disconnect the circuit.

According to an example embodiment of this application, a method for determining a predicted current value within a coming next sampling period is the same as the foregoing, and includes obtaining a current value detected within a sampling period of the solid state circuit breaker, and determining a predicted current value of a coming current within a next sampling period of the present sampling period of the solid state circuit breaker according to the detected current value. The current value of the coming current is predicted according to the current value detected within the solid state circuit breaker, so that the solid state circuit breaker can determine in advance whether to perform the operation of disconnecting the circuit.

A method for controlling a solid state circuit breaker according to an example embodiment permits, a waiting time to be set for the solid state circuit breaker, to disconnect the solid state circuit breaker close to the failure position, and after the failure position is isolated from the power grid, other circuits are not affected by the failure or circuit disconnection, to implement selective protection of the circuit, and avoid damaging the solid state circuit breaker itself, thereby reducing the complexity and cable costs for implementing a circuit system of the selective protection.

Figure 4:
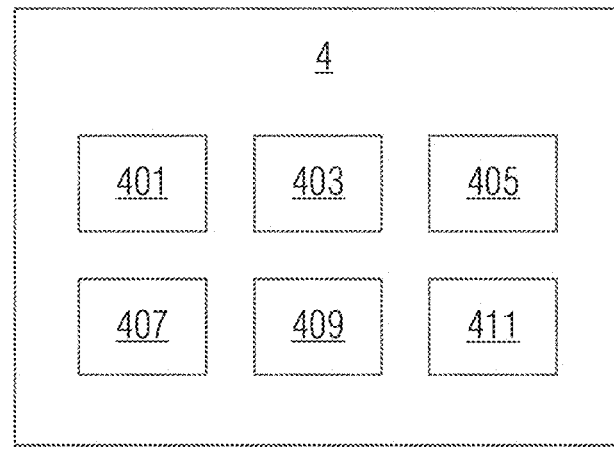
FIG. 4 is a schematic diagram of an apparatus for controlling a solid state circuit breaker according to an example embodiment of this application.

According to an embodiment of this application, an apparatus for controlling a solid state circuit breaker is further provided. FIG. 4 is a schematic diagram of an apparatus for controlling a solid state circuit breaker according to an embodiment of this application. As shown in FIG. 4, the apparatus 4 for controlling a solid state circuit breaker according to an embodiment of this application includes: a current direction detection unit 401, configured to detect a direction of a current flowing through the solid state circuit breaker. In an embodiment according to this application, the solid state circuit breaker is located at a power supply end of a power grid bus in a DC power grid. A breaking current value obtaining unit 403 is configured to obtain a breaking current value of the solid state circuit breaker according to the detected direction of the current. A maximum threshold obtaining unit 405 is configured to obtain a value of a maximum threshold current allowed to flow through the solid state circuit breaker, where the breaking current value is less than the maximum threshold current value. A predicted current value obtaining unit 407 is configured to obtain a predicted current value of a coming current within a next sampling period of a present sampling period of the solid state circuit breaker. A comparison unit 409 is configured to compare the predicted current value with the breaking current value. A breaking unit 411 is configured to: make, if the predicted current value is greater than the breaking current value, the solid state circuit breaker wait, and when the predicted current value is greater than the maximum threshold current value, make the solid state circuit breaker disconnect the circuit in which the solid state circuit breaker resides. The apparatus 4 for controlling a solid state circuit breaker according to an embodiment of this application performs the method for controlling a solid state circuit breaker of a power supply end shown in FIG. 2. Details are not described herein again. According to this embodiment of this application, the apparatus for controlling a solid state circuit breaker is disposed, a waiting time is set for a solid state circuit breaker of a power supply end, so that the solid state circuit breaker does not immediately perform the operation of disconnecting the circuit when detecting the fault current, circuit breakers at other positions on the circuit can detect a failure, thereby making a circuit breaker close to the failure disconnect the selective circuit protection of the circuit.

Figure 5:
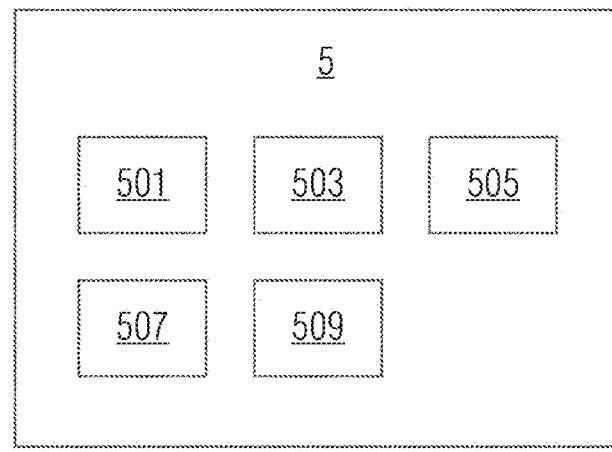
FIG. 5 is a schematic diagram of an apparatus for controlling a solid state circuit breaker according to another example embodiment of this application.

According to another embodiment of this application, an apparatus for controlling a solid state circuit breaker is further provided. FIG. 5 is a schematic diagram of an apparatus for controlling a solid state circuit breaker according to another embodiment of this application. As shown in FIG. 5, the apparatus 5 for controlling a solid state circuit breaker according to another embodiment of this application includes: a current direction detection unit 501, configured to detect a direction of a current flowing through the solid state circuit breaker. In another embodiment according to this application, the solid state circuit breaker is located at a load end of a power grid bus in a DC power grid. A maximum threshold obtaining unit 503 is configured to obtain a value of a maximum threshold current allowed to flow through the solid state circuit breaker. A predicted current value obtaining unit 505 is configured to obtain a predicted current value of a coming current within a next sampling period of a present sampling period of the solid state circuit breaker. A comparison unit 507 is configured to compare the predicted current value with the maximum threshold current value if the detected direction of the current is a direction from a load end of the solid state circuit breaker to the power supply end. A breaking unit 509 is configured to make, if the predicted current value is greater than the maximum threshold current value, the solid state circuit breaker disconnect the circuit in which the solid state circuit breaker resides. The apparatus 5 for controlling a solid state circuit breaker according to an embodiment of this application performs the method for controlling a solid state circuit breaker of a load end shown in FIG. 3. Details are not described herein again. According to this embodiment of this application, the apparatus for controlling a solid state circuit breaker is disposed, a waiting time is set for a solid state circuit breaker of a load end, so that the solid state circuit breaker does not immediately perform the operation of disconnecting the circuit when detecting the fault current, circuit breakers at other positions on the circuit can detect a failure, making a circuit breaker close to the failure disconnect the selective circuit protection of the circuit.

Figure 6:
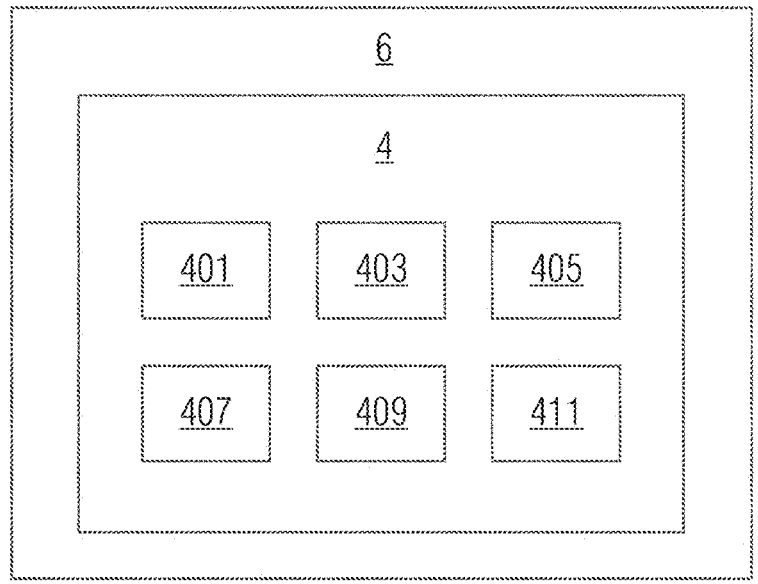
FIG. 6 is a schematic diagram of a solid state circuit breaker according to an example embodiment of this application.

According to an embodiment of this application, a solid state circuit breaker is further provided. FIG. 6 is a schematic diagram of a solid state circuit breaker according to an embodiment of this application. As shown in FIG. 6, the solid state circuit breaker 6 according to an embodiment of this application is located at a power supply end of a power grid bus in a DC power grid, and includes the apparatus 4 for controlling a solid state circuit breaker shown in FIG. 4.

Figure 7:
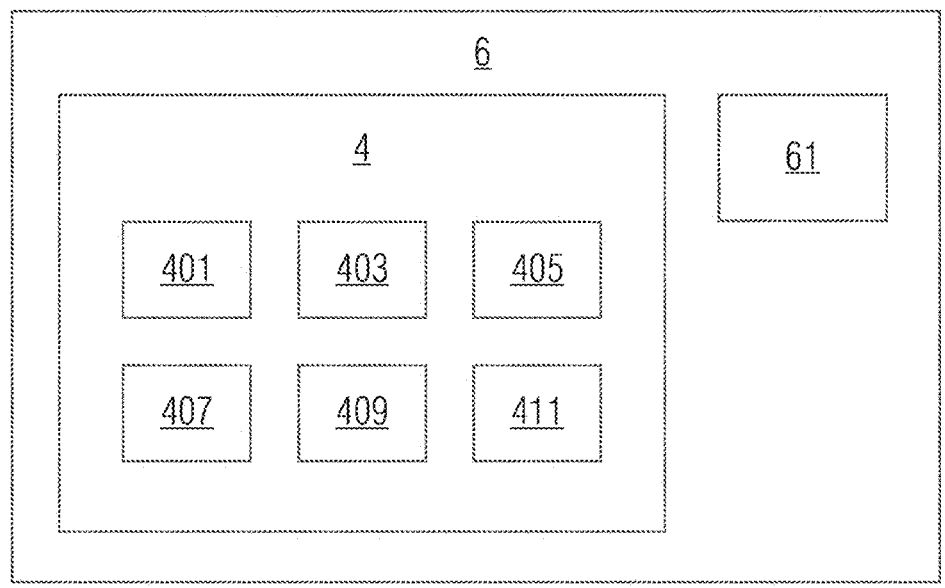
FIG. 7 is a schematic diagram of a solid state circuit breaker according to an example embodiment of this application.

FIG. 7 is a schematic diagram of a solid state circuit breaker according to an example embodiment of this application. According to an example embodiment of this application, the solid state circuit breaker 6 further includes: a current limiting unit 61, configured to limit an increasing rate of the current flowing through the solid state circuit breaker 6. The current limiting unit 61 may be one or more inductors or one or more inductors wrapped on the iron core, and play a current limiting role in the solid state circuit breaker, to avoid device damage caused by instantaneously increasing the current.

Figure 8:
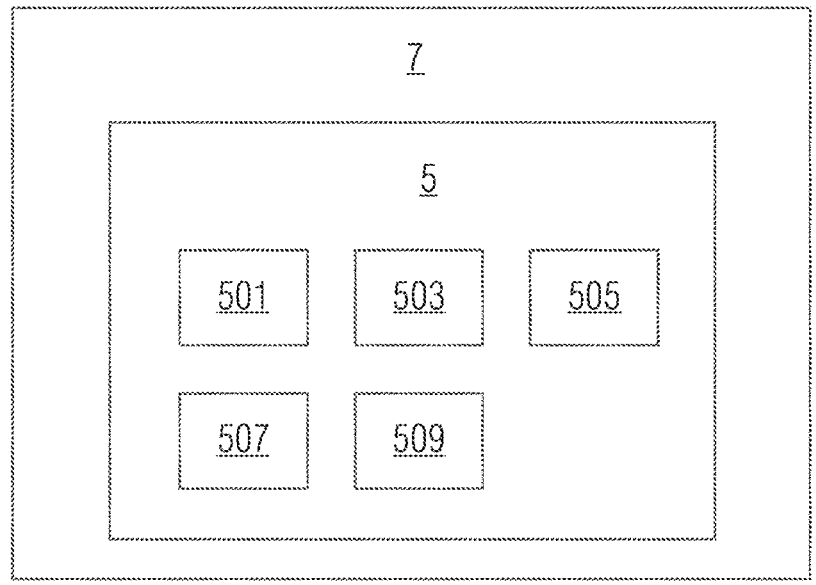
FIG. 8 is a schematic diagram of a solid state circuit breaker according to another example embodiment of this application.

According to another embodiment of this application, a solid state circuit breaker is further provided. FIG. 8 is a schematic diagram of a solid state circuit breaker according to another embodiment of this application. As shown in FIG. 8, the solid state circuit breaker 7 according to another embodiment of this application is located at a load end of a power grid bus in a DC power grid, and includes the apparatus 5 for controlling a solid state circuit breaker shown in FIG. 5.

Figure 9:
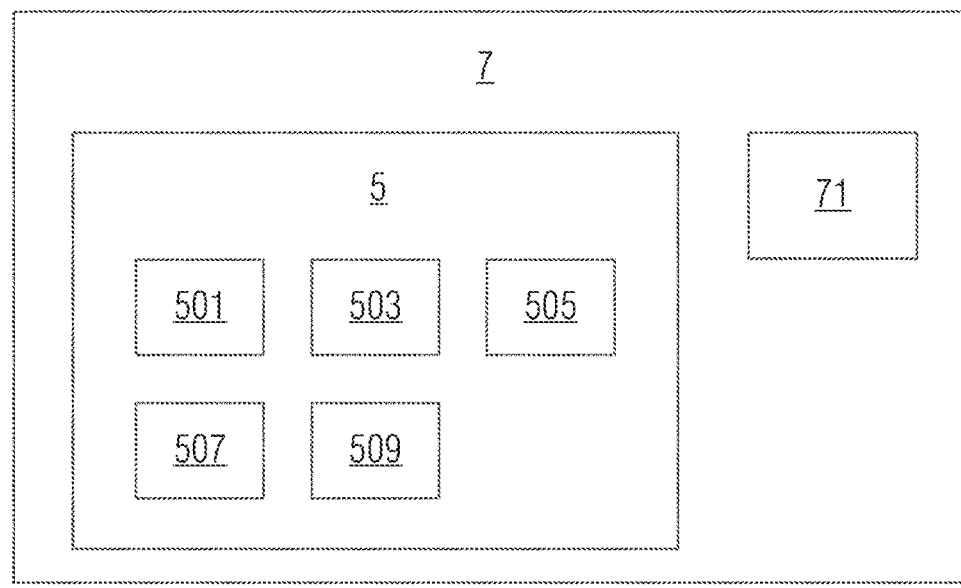
FIG. 9 is a schematic diagram of a solid state circuit breaker according to an example embodiment of this application.

FIG. 9 is a schematic diagram of a solid state circuit breaker according to an example embodiment of this application. According to an example embodiment of this application, the solid state circuit breaker 7 further includes: a current limiting unit 71, configured to limit an increasing rate of the current flowing through the solid state circuit breaker 7. The current limiting unit 71 may be one or more inductors or one or more inductors wrapped on the iron core, and play a current limiting role in the solid state circuit breaker, to avoid device damage caused by instantaneously increasing the current.

In the foregoing embodiments of this application, descriptions of the embodiments have different emphases, and as for parts that are not described in detail in one embodiment, reference can be made to the relevant description of the other embodiments.

By using the forward protection and backward protection based on the solid state circuit breaker of the power supply end and the solid state circuit breaker of the load end in the technical solutions of this application, a circuit protection device close to the failure position disconnects the circuit, and protects the solid state circuit breaker from being damaged by an excessive current, thereby reducing cabling requirements for selective circuit protection, and reducing the circuit complexity.

In the several embodiments provided in this application, it should be understood that the disclosed technical content may be implemented in other manners. The described apparatus embodiments are examples. For example, the unit or module division is a logical function division and may be another division in actual implementation. For example, a plurality of units or modules or components may be combined or integrated into a system, or some features may be ignored or not performed. In addition, the displayed or discussed mutual couplings or direct couplings or communication connections may be implemented through some interfaces. The indirect couplings or communication connections between the modules or units may be implemented in electronic or other forms.

The units or modules described as separate parts may or may not be physically separate, and the parts displayed as units or modules may or may not be physical units or modules, may be located in one position, or may be distributed on a plurality of network units or modules. A part of or all of the units or modules may be selected according to actual needs to achieve the objectives of the solutions of the embodiments.

In addition, functional units or modules in the embodiments of this application may be integrated into one processing unit or module, or each of the units or modules may exist alone physically, or two or more units or modules may be integrated into one unit or module. The integrated unit or module may be implemented in a form of hardware, or may be implemented in a form of a software functional unit or module.

If implemented in the form of software functional units and sold or used as an independent product, the integrated units may also be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a read-only memory (ROM), a random access memory (RAM), a removable hard disk, a magnetic disk, or an optical disc.

The foregoing descriptions are merely preferred embodiments of this application, and it should be noted that, a person of ordinary skill in the art may make various improvements and refinements without departing from the spirit of this application. All such modifications and refinements should also be intended to be covered by this application.

What is claimed is:

1. A method for controlling a solid state circuit breaker, comprising:
    detecting a direction of a current flowing through the solid state circuit breaker, wherein the solid state circuit breaker is at a power supply end of a power grid bus in a direct current (DC) power grid;
    obtaining a breaking current value of the solid state circuit breaker according to the detected direction of the current;
    obtaining a value of a maximum threshold current to flow through the solid state circuit breaker, wherein the breaking current value is less than the maximum threshold current value;
    obtaining a predicted current value within a next sampling period of a present sampling period of the solid state circuit breaker;
    comparing the predicted current value with the breaking current value; and
    upon the predicted current value being greater than the breaking current value, delaying solid state circuit breaker, and upon the predicted current value being greater than the maximum threshold current value, controlling the solid state circuit breaker to disconnect a circuit in which the solid state circuit breaker resides.

2. The method according to claim 1, further comprising:
    obtaining a first current value, the first current value being detected within a sampling period of the solid state circuit breaker; and
    determining the predicted current value within the next sampling period of the present sampling period of the solid state circuit breaker according to the first current value.

3. The method according to claim 2, wherein
    the detected direction of the current comprises a forward direction or a backward direction, wherein the forward direction represents a direction from a power supply end of the solid state circuit breaker to a load end of the solid state circuit breaker, and the backward direction represents a direction from the load end of the solid state circuit breaker to the power supply end of the solid state circuit breaker, and
    the obtained breaking current value comprises a forward breaking current value corresponding to a forward current or a backward breaking current value corresponding to a backward current, wherein the forward breaking current value represents a current value of a breaking current of the solid state circuit breaker when the forward current flows through the solid state circuit breaker, and the backward breaking current value represents a current value of a breaking current of the solid state circuit breaker when the backward current flows through the solid state circuit breaker.

4. The method according to claim 1, wherein
    the detected direction of the current comprises a forward direction or a backward direction, wherein the forward direction represents a direction from a power supply end of the solid state circuit breaker to a load end of the solid state circuit breaker, and the backward direction represents a direction from the load end of the solid state circuit breaker to the power supply end of the solid state circuit breaker, and
    the obtained breaking current value comprises a forward breaking current value corresponding to a forward current or a backward breaking current value corresponding to a backward current, wherein the forward breaking current value represents a current value of a breaking current of the solid state circuit breaker when the forward current flows through the solid state circuit breaker, and the backward breaking current value represents a current value of a breaking current of the solid state circuit breaker when the backward current flows through the solid state circuit breaker.

5. The method according to claim 3, wherein
upon the detected direction of the current being the forward direction, the obtaining a breaking current value of the solid state circuit breaker obtains the forward breaking current value of the solid state circuit breaker, and
the comparing the predicted current value with the breaking current value comprises comparing the predicted current value with the forward breaking current value.

6. The method according to claim 4, wherein
upon the detected direction of the current being the backward direction, the obtaining a breaking current value of the solid state circuit breaker obtains the backward breaking current value of the solid state circuit breaker, and
the comparing the predicted current value with the breaking current value compares the predicted current value with the backward breaking current value.

7. A method for controlling a solid state circuit breaker, comprising:
detecting a direction of a current flowing through the solid state circuit breaker, wherein the solid state circuit breaker is at a load end of a power grid bus in a direct current (DC) power grid;
obtaining a value of a maximum threshold current to flow through the solid state circuit breaker;
obtaining a predicted current value within a next sampling period of a present sampling period of the solid state circuit breaker;
comparing the predicted current value with the maximum threshold current value upon the detected direction of the current being a direction from a load end of the solid state circuit breaker to a power supply end of the solid state circuit breaker; and
upon the predicted current value being greater than the maximum threshold current value, controlling the solid state circuit breaker to disconnect a circuit in which the solid state circuit breaker resides.

8. The method according to claim 7, further comprising:
obtaining a breaking current value of the solid state circuit breaker;
comparing the predicted current value with the breaking current value upon the detected direction of the current being a direction from the power supply end of the solid state circuit breaker to the load end of the solid state circuit breaker; and
upon the predicted current value being greater than the breaking current value, controlling the solid state circuit breaker to disconnect the circuit in which the solid state circuit breaker resides.

9. The method according to claim 8, further comprising:
obtaining a first current value, the first current value detected within a sampling period of the solid state circuit breaker; and
determining the predicted current value within the next sampling period of the present sampling period of the solid state circuit breaker according to the first current value.

10. The method according to claim 7, further comprising:
obtaining a first current value, the first current value detected within a sampling period of the solid state circuit breaker; and
determining the predicted current value within the next sampling period of the present sampling period of the solid state circuit breaker according to the first current value.

11. An apparatus for controlling a solid state circuit breaker, comprising:
a current direction detection unit configured to detect a direction of a current flowing through the solid state circuit breaker, wherein the solid state circuit breaker is at a power supply end of a power grid bus in a direct current (DC) grid;
a breaking current value obtaining unit, configured to obtain a breaking current value of the solid state circuit breaker according to the detected direction of the current;
a maximum threshold obtaining unit, configured to obtain a value of a maximum threshold current to flow through the solid state circuit breaker, wherein the breaking current value is less than the maximum threshold current value;
a predicted current value obtaining unit configured to obtain a predicted current value a next sampling period of a present sampling period of the solid state circuit breaker;
a comparison unit configured to compare the predicted current value with the breaking current value; and
a breaking unit configured to delay the solid state circuit breaker upon the predicted current value being greater than the breaking current value, and the solid state circuit breaker to disconnect the a circuit in which the solid state circuit breaker resides when the predicted current value is greater than the maximum threshold current value, make.

12. An apparatus for controlling a solid state circuit breaker, comprising:
a current direction detection unit configured to detect a direction of a current flowing through the solid state circuit breaker, wherein the solid state circuit breaker is at a load end of a power grid bus in a direct current (DC) power grid;
a maximum threshold obtaining unit configured to obtain a value of a maximum threshold current to flow through the solid state circuit breaker;
a predicted current value obtaining unity configured to obtain a predicted current value within a next sampling period of a present sampling period of the solid state circuit breaker;
a comparison unit configured to compare the predicted current value with the maximum threshold current value upon the detected direction of the current being a direction from a load end of the solid state circuit breaker to a power supply end; and
a breaking unit configured to control the solid state circuit breaker to disconnect a circuit in which the solid state circuit breaker resides when the predicted current value is greater than the maximum threshold current value.

13. A solid state circuit breaker, wherein the solid state circuit breaker is at a power supply end of a power grid bus in a (DC) power grid, the solid state circuit breaker comprises
an apparatus for controlling the solid state circuit breaker, the apparatus including,
a current direction detection unit, configured to detect a direction of a current flowing through the solid state circuit breaker;
a breaking current value obtaining unit, configured to obtain a breaking current value of the solid state circuit breaker according to the detected direction of the current;
a maximum threshold obtaining unit, configured to obtain a value of a maximum threshold current to flow through the solid state circuit breaker, wherein the breaking current value is less than the maximum threshold current value;

a predicted current value obtaining unit, configured to obtain a predicted current value within a next sampling period of a present sampling period of the solid state circuit breaker;

a comparison unit; configured to compare the predicted current value with the breaking current value; and a breaking unity configured to delay the solid state circuit breaker upon the predicted current value being greater than the breaking current value, and control the solid state circuit breaker to disconnect a circuit in which the solid state circuit breaker resides when the predicted current value is greater than the maximum threshold current value, make.

14. The solid state circuit breaker according to claim 13, further comprising:

a current limiting unit configured to limit an increasing speed of a current flowing through the solid state circuit breaker.

15. A solid state circuit breaker, wherein the solid state circuit breaker is at a load end of a power grid bus in a direct current (DC) power grid, the solid state circuit breaker comprises:

an apparatus for controlling the solid state circuit breaker, the apparatus including, a current direction detection unit; configured to detect a direction of a current flowing through the solid state circuit breaker;

a maximum threshold obtaining unit, configured to obtain a value of a maximum threshold current to flow through the solid state circuit breaker;

a predicted current value obtaining unit configured to obtain a predicted current value within a next sampling period of a present sampling period of the solid state circuit breaker;

a comparison unit configured to compare the predicted current value with the maximum threshold current value upon the detected direction of the current being a direction from a load end of the solid state circuit breaker to a power supply end; and a breaking unit configured to control solid state circuit breaker to disconnect a circuit in which the solid state circuit breaker resides upon the predicted current value being greater than the maximum threshold current value.

\* \* \* \* \*